US009589122B2

(12) United States Patent
Song et al.

(10) Patent No.: US 9,589,122 B2
(45) Date of Patent: Mar. 7, 2017

(54) OPERATION PROCESSING METHOD AND DEVICE

(71) Applicant: Tencent Technology (Shenzhen) Company Limited, Shenzhen (CN)

(72) Inventors: Zhigang Song, Shenzhen (CN); Ming Chen, Shenzhen (CN); Yabei Guan, Shenzhen (CN); Jun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 71 days.

(21) Appl. No.: 14/581,628

(22) Filed: Dec. 23, 2014

(65) Prior Publication Data

US 2015/0143475 A1 May 21, 2015

Related U.S. Application Data

(63) Continuation of application No. PCT/CN2014/084081, filed on Aug. 11, 2014.

(30) Foreign Application Priority Data

Nov. 19, 2013 (CN) .......................... 2013 1 0586067

(51) Int. Cl.
H04L 29/00 (2006.01)
G06F 21/33 (2013.01)
(Continued)

(52) U.S. Cl.
CPC ............ *G06F 21/335* (2013.01); *G06F 21/40* (2013.01); *H04L 63/08* (2013.01)

(58) Field of Classification Search
CPC ....... H04L 63/10; H04L 63/08; G06F 21/335; G06F 21/40
See application file for complete search history.

(56) References Cited

U.S. PATENT DOCUMENTS 7,958,543 B2 * 6/2011 Samji ...................... H04L 63/20
709/203
8,321,364 B1 11/2012 Gharpure et al.
(Continued)

FOREIGN PATENT DOCUMENTS

CN 103136668 A 6/2013
CN 103166828 A 6/2013
CN 103186860 A 7/2013

OTHER PUBLICATIONS

International Search Report and Written Opinion dated Nov. 18, 2014 for International Application No. PCT/CN2014/084081, 7 pages.

*Primary Examiner* — Brandon Hoffman
*Assistant Examiner* — Helai Salehi
(74) *Attorney, Agent, or Firm* — Brinks Gilson & Lione

(57) ABSTRACT

A method and a device are provided in the field of network technology. In the method, a first server receives an operation request including a second server identifier and second account information. According to the second server identifier and the second account information, the first server determines whether associated account information is available in a predetermined three-party associating relationship. Upon determining that the associated account information is available, the first server obtains the associated account information for use as first account information. Based on the first account information, the first server responds to the operation request. During the process of providing services for a terminal by the second server, the first server obtains the first account information according to the second server identifier, the second account information, and the predetermined three-party associating relationship. The first server responds to the operations of the terminal based on the first account information.

16 Claims, 5 Drawing Sheets

(51) Int. Cl.
  *H04L 29/06*  (2006.01)
  *G06F 21/40*  (2013.01)

(56) References Cited

U.S. PATENT DOCUMENTS

| | | | |
|---|---|---|---|
| 2008/0040437 A1* | 2/2008 | Agarwal | G06Q 10/107 |
| | | | 709/206 |
| 2008/0065776 A1 | 3/2008 | Moloney et al. | |
| 2014/0279556 A1* | 9/2014 | Priebatsch | G06Q 20/322 |
| | | | 705/67 |

* cited by examiner

OPERATION PROCESSING METHOD AND DEVICE

CROSS-REFERENCE TO RELATED APPLICATIONS

This application is a continuation of International Application No. PCT/CN2014/084081, filed on Aug. 11, 2014, which claims priority to Chinese Patent Application No. 201310586067.3, filed on Nov. 19, 2013, which is hereby incorporated by reference in its entirety.

FIELD

The present disclosure relates to an operation processing method and device in the field of network technology.

BACKGROUND

With rapid development of Internet technologies and increasing demand for interactions between different network service platforms, terminals enable cross-platform operations. For example, when a terminal accesses a shopping website, the server of the shopping website platform provides services; when the terminal triggers a payment operation, the terminal jumps to an e-payment platform and then the server of the e-payment platform makes payment for the order issued in the shopping website platform.

During the cross-platform operations, the terminal transfers the login token of the account information to the target server. According to the login token, the target server identifies the account and determines the associated account information stored in the target server, so as to perform subsequent operations. Take Server A and Server B as an example. When a terminal logs into Server A by using the account IDa, Server A issues a login token to the account IDa. When the terminal detects the operation of jumping from Server A to Server B, the terminal transfers the login token to Server B. Via the interface with Server A, Server B checks with Server A whether the login token is legal. If the login token is legal, Server B determines the account IDb stored in Server B associated with the account IDa, so that the terminal can perform subsequent operations based on the account IDb. During the identification process, however, the terminal needs to interact with the servers repeatedly and the interaction process is complex and time-consuming.

SUMMARY

To overcome the problems of the prior art, the embodiments of the present disclosure provide a method and device for operation processing. The technical solution is as follows:

In a first respect, the embodiments of the present disclosure provide an operation processing method, comprising:

The first server receives an operation request including the second server identifier and the second account information. The second account is used by a terminal to log into the second server. According to the second server identifier and the second account information, the first server determines whether account information associated with the second server identifier and the second account information is available in a predetermined three-party associating relationship, where the predetermined three-party associating relationship is the associating relationship between the second server identifier, the account information of the second server, and the account information of the first server. Upon determining that the account information associated with the second server identifier and the second account information is available in the predetermined three-party associating relationship, the first server obtains the associated account information for use as the first account information. Based on the first account information, the first server responds to the operation request.

In a second respect, the embodiments of the present disclosure provide an operation processing method. The second server receives an operation instruction sent by a terminal, wherein the operation instruction includes the first server identifier, and the second account information used by the terminal to log into the second server. According to the first server identifier, the second server sends an operation request including the second server identifier and the second account information to the first server, so that the first server determines whether account information associated with the second server identifier and the second account information is available in a predetermined three-party associating relationship, and, if yes, responds to the operation request based on the account information associated with the second server identifier and the second account information.

In a third respect, the embodiments of the present disclosure provide an operation processing device. A request receiving module is configured to receive an operation request including the second server identifier and the second account information used by a terminal to log into the second server. A determination module is configured to determine, according to the second server identifier and the second account information, whether account information associated with the second server identifier and the second account information is available in a predetermined three-party associating relationship, wherein the predetermined three-party associating relationship is the associating relationship between the second server identifier, the account information of the second server, and the account information of the local side. The first account acquisition module is configured to obtain the account information associated with the second server identifier and the second account information for use as the first account information when it is determined that the account information associated with the second server identifier and the second account information is available in the predetermined three-party associating relationship. A request response module is configured to respond to the operation request based on the first account information.

In a fourth respect, the embodiments of the present disclosure provide an operation processing device. An operation instruction receiving module is configured to receive an operation instruction sent by a terminal, wherein the operation instruction includes a first server identifier and second account information used by the terminal to log into the local side. A request sending module is configured to send an operation request to the first server according to the first server identifier, wherein the operation request includes a local side identifier and the second account information, so that the first server determines whether account information associated with the local side identifier and the second account information is available in the predetermined three-party associating relationship, and, if yes, responds to the operation request based on the account information associated with the local side identifier and the second account information.

The solution provided by the embodiments of the present disclosure has the following beneficial effects:

With the method and device provided by the embodiments of the present disclosure, the second server provides services for the terminal, the first server obtains the first account information according to the second server identifier, the second account information used by the terminal to log into the second server, and the predetermined three-party associating relationship, and responds to the operations of the terminal based on the first account information, thus streamlining the interactions between the terminal and the first and second servers, and reducing the time consumed by cross-service operations.

BRIEF DESCRIPTION OF THE DRAWINGS

For a better description of the technical solution provided in the embodiments of the present disclosure, the following section briefly describes the drawings required for describing the embodiments of the present disclosure. Obviously, the following drawings are only some embodiments of the present disclosure from which other drawings may be derived by a person skilled in the art without inputting creative effort.

DETAILED DESCRIPTION OF THE DRAWINGS

Figure 1:
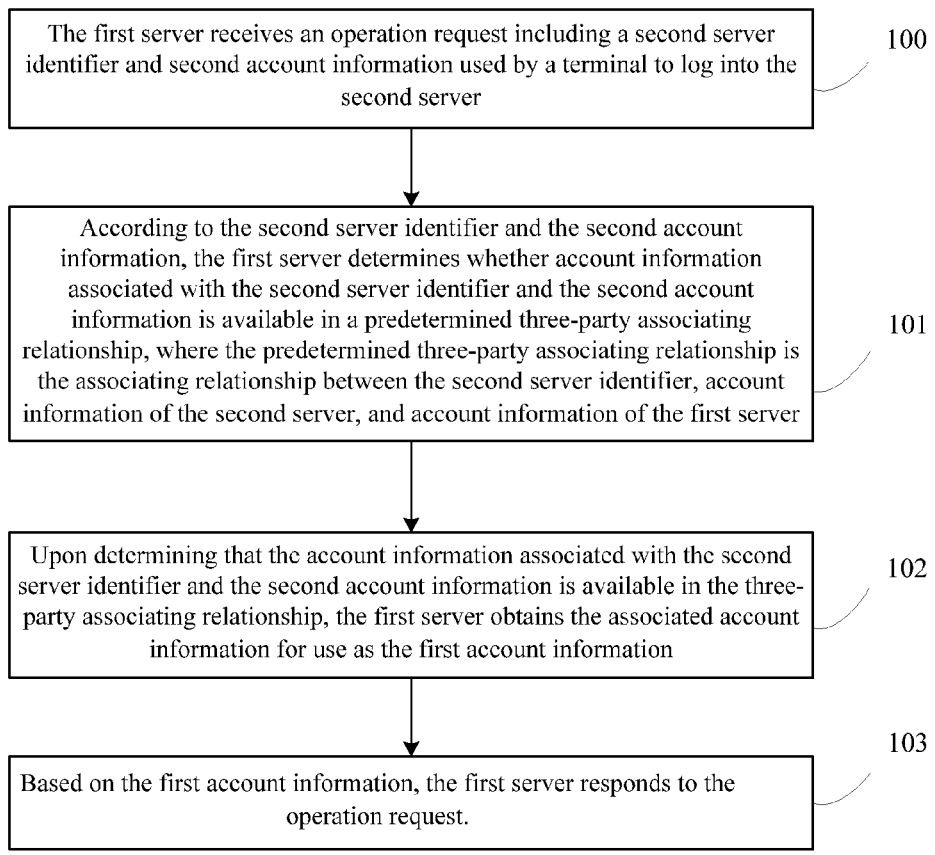
FIG. 1 shows the flowchart of an operation processing method provided in an embodiment of the present disclosure.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

In conjunction with the drawings provided in embodiments of the present disclosure, the following section clearly and comprehensively describes the technical solution provided by embodiments of the present disclosure. Obviously, the described embodiments are only some but not all of the embodiments of the present disclosure. All other embodiments that a person skilled in the art derives from the embodiments of the present disclosure without creative work fall within the claims of the present disclosure.

FIG. 1 shows the flowchart of an operation processing method provided in an embodiment of the present disclosure, wherein the executive body of an embodiment of the present disclosure is the first server, comprising:

101: The first server receives an operation request including the second server identifier, and the second account information used by a terminal to log into the second server.

102: According to the second server identifier and the second account information, the first server determines whether account information associated with the second server identifier and the second account information is available in a predetermined three-party associating relationship, wherein the predetermined three-party associating relationship is the associating relationship between the second server identifier, account information of the second server, and the account information of the first server.

103: Upon determining that the account information associated with the second server identifier and the second account information is available in the predetermined three-party associating relationship, the first server obtains the account information associated with the second server identifier and the second account information for use as the first account information.

104: Based on the first account information, the first server responds to the operation request.

In the method provided by the embodiments of the present disclosure, during the process when the second server provides services for the terminal, the first server obtains the first account information according to the second server identifier, the second account information used by the terminal to log into the second server, and the predetermined three-party associating relationship, and responds to the operations of the terminal based on the first account information, thus streamlining the interactions between the terminal and servers and reducing the time consumed by cross-service operations.

Optionally, the receiving of the operation request by the first server includes:

The first server receives an operation request sent by the second server;

Alternatively, the first server receives the operation request forwarded by the terminal.

Optionally, the operation request further includes a digital signature generated by the second server according to the second server identifier and the second account information; and:

According to the second server identifier and the second account information included in the operation request, the first server determines whether the digital signature is legal;

Upon determining that the digital signature is legal, the first server determines whether the predetermined three-party associating relationship includes the account information associated with the second server identifier and the second account information.

Optionally, the operation request further includes the time information and the digital signature generated by the second server according to the second server identifier, the second account information, and the time information; and:

According to the second server identifier, the second account information, and the time information included in the operation request, the first server determines whether the digital signature is legal;

Upon determining that the digital signature is legal, the first server determines whether the predetermined three-party associating relationship includes the account information associated with the second server identifier and the second account information.

Optionally, the time information is the information of the time when the second server generates the digital signature.

Optionally, the first server determines whether the predetermined three-party associating relationship includes the account information associated with the second server identifier and the second account information, and then:

Upon determining that the account information associated with the second server identifier and the second account information is not available in the predetermined three-party associating relationship, the first server sends an account information request to the terminal, so that the terminal obtains account information inputted by a user and returns the account information to the first server;

The first server receives the account information inputted by the user;

The first server obtains the account information inputted by the user for use as the first account information;

The first server saves the associating relationship between the three parties of the second server identifier, the second account information, and the first account information.

Optionally, the account information inputted by the user is obtained for use as the first account information, comprising:

The first server determines whether the account information is the account information of the first server.

Upon determining that the account information is the account information of the first server, the first server obtains the account information for use as the first account information.

Upon determining that the account information is not the account information of the first server, the first server registers the account information and obtains the account information for use as the first account information.

All of the above optional technical solutions may be combined in any way to form an optional embodiment of the present disclosure.

Figure 2:
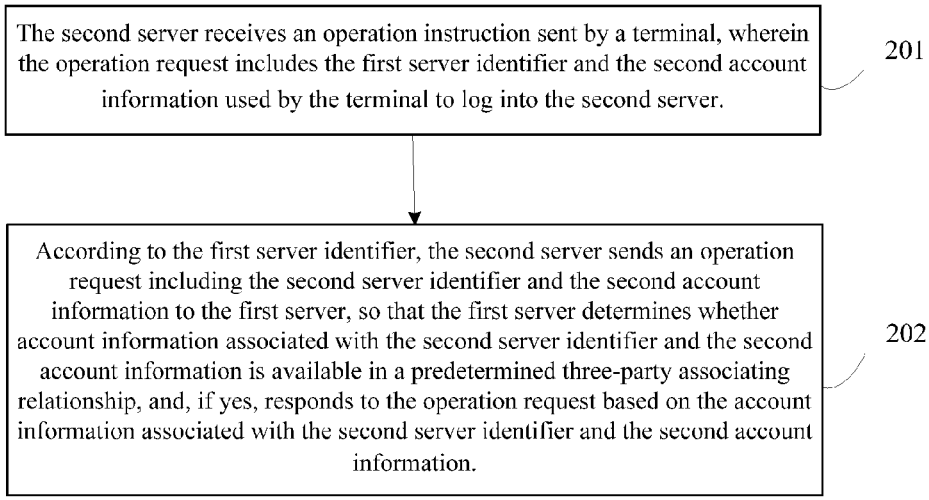
FIG. 2 shows the flowchart of an operation processing method provided in an embodiment of the present disclosure.

FIG. 2 shows the flowchart of an operation processing method provided in an embodiment of the present disclosure, where the executive body in an embodiment of the present disclosure is the second server. The method includes the following acts:

201: The second server receives an operation instruction sent by a terminal, wherein the operation instruction includes a first server identifier, and a second account information used by the terminal to log into a second server;

202: According to the first server identifier, the second server sends an operation request including the second server identifier and the second account information to the first server, so that the first server determines whether account information associated with the second server identifier and the second account information is available in a predetermined three-party associating relationship, and, if yes, responds to the operation request based on the account information associated with the second account information and the second server identifier.

In the method provided by the embodiments of the present disclosure, during the process when the second server provides services for the terminal, the first server obtains the first account information according to the second server identifier, the second account information used by the terminal to log into the second server, and the predetermined three-party associating relationship, and responds to the operations of the terminal based on the first account information, thus streamlining the interactions between the terminal and the first and the second servers and reducing the time consumed by cross-service operations.

Optionally, the sending of an operation request by the second server sends to the first server according to the first server identifier includes:

The second server sends the operation request to the first server according to the first server identifier;

Or, the second server sends the operation request to the terminal, so that the terminal forwards the operation request to the first server according to the first server identifier.

Optionally, the sending of an operation request by the second server sends to the first server according to the first server identifier includes:

The second server generates a digital signature according to the second server identifier and the second account information;

The second server sends the operation request including the second server identifier, the second account information, and the digital signature to the first server, so that the first server determines whether the digital signature is legal according to the second server identifier and the second account information.

Optionally, the sending of an operation request by the second server to the first server according to the first server identifier includes:

The second server generates a digital signature according to the second server identifier, the second account information, and the time information;

The second server sends the operation request including the second server identifier, the second account information, the time information and the digital signature to the first server, so that the first server determines whether the digital signature is legal according to the second server identifier, the second account information, and the time information.

Optionally, the time information is the information of the time when the second server generates the digital signature.

All of the above optional technical solutions may be combined in any way to form an optional embodiment of the present disclosure.

Figure 3:
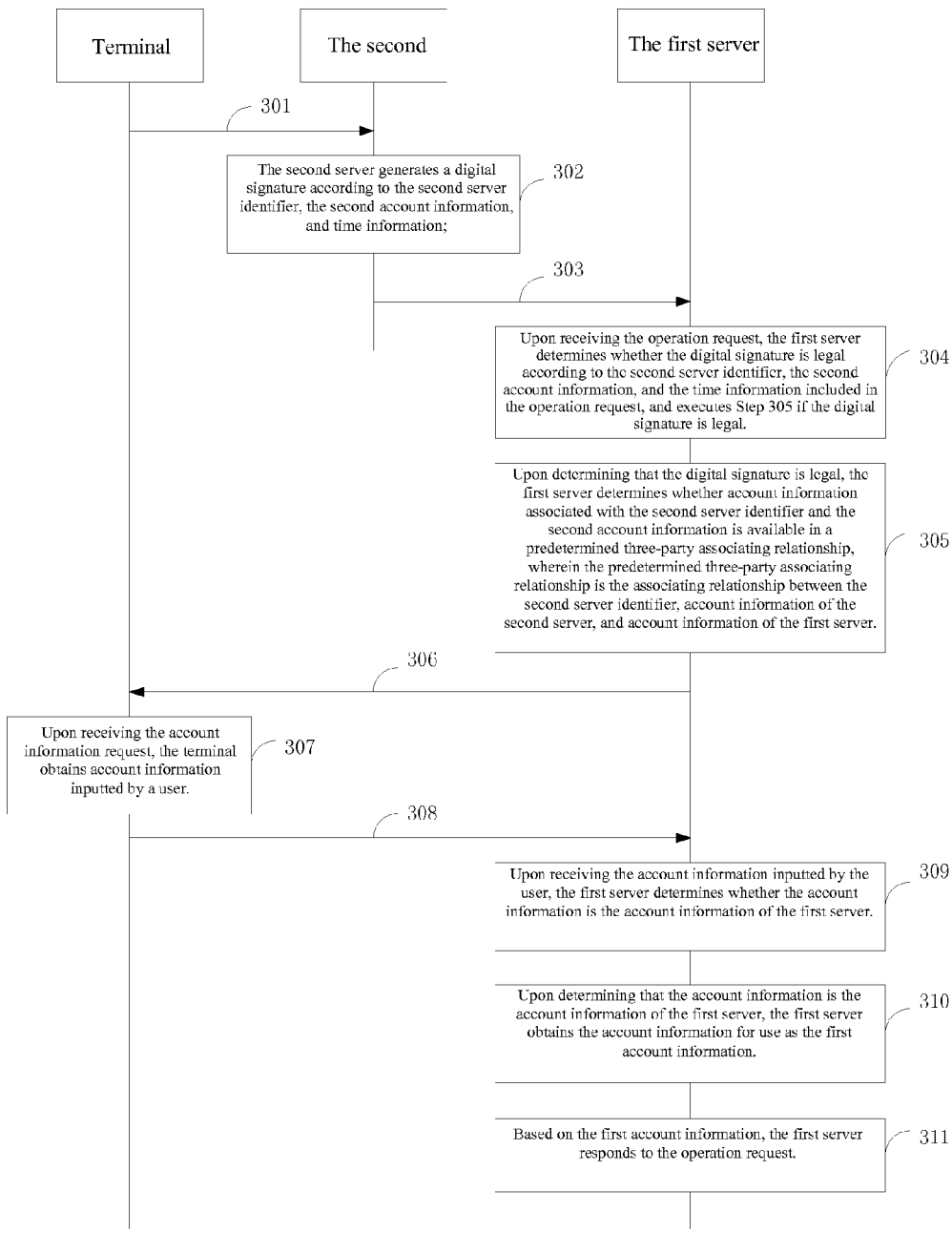
FIG. 3 shows the flowchart of an operation processing method provided in an embodiment of the present disclosure.

FIG. 3 shows the flowchart of an operation processing method provided in an embodiment of the present disclosure, wherein the executive bodies in an embodiment of the present disclosure are the first server, the second server, and the terminal, the method comprising:

301: The terminal sends an operation instruction to the second server, wherein the operation instruction includes the first server identifier, and the second account information used by the terminal to log into the second server.

For example, the terminal logs into the second server based on the second account information, and the second server provides services for the terminal; when the terminal detects that an operation requiring response from the first server is triggered in the scenario where the second server provides services, that is, the terminal needs to switch to being serviced by the first server, the terminal sends the operation instruction to the second server, so that the second server subsequently sends an operation request to the first server so that the first server provides services for the terminal in response to the operation.

Here, the first server identifier is configured to determine the first server and can be the name, address, or ID of the first server, which is not restricted by the embodiments of the present disclosure. The second account information is the account information registered under the account mechanism of the second server, and may be a user account, a user account plus a password, or a user account or a password plus a verification code, and so on, which is not restricted by the embodiments of the present disclosure.

For example, assume that the first server is an e-bank server, the second server is a shopping website server, and the terminal logs into the shopping website server based on the second account information; upon detecting an online payment operation, the terminal sends an operation instruction to the second server, wherein the operation instruction includes the second account information and the name of the e-bank server and is configured to request for switching from the shopping website server to the e-bank server, so that the e-bank server provides online payment services for the terminal.

302: The second server generates a digital signature according to the second server identifier, the second account information, and time information;

For example, the second server generates the digital signature according to the second server identifier, the second account information, the time information, and the predetermined signature algorithm;

Here, the predetermined signature algorithm can be the RSA algorithm (public key encryption algorithm), Message Summary Algorithm 5 (MD5), or Secure Hash Algorithm (SHA-1), and accordingly the digital signature can be a RSA digital signature, MD5 digital signature, or SHA-1 signature, and the predetermined signature algorithm can further be a symmetrical signature algorithm or asymmetrical signature algorithm, which is not restricted by the embodiments of the present disclosure.

In embodiments of the present disclosure, the time information can be the information of time when the second server generates the digital signature, or the information of the time when the second server modifies the digital signature, which is not restricted by the embodiments of the present disclosure.

In practice, the second server can generate the digital signature by using the Digital Time-Stamp (DTS) service, that is, the second server sends a summary of the file generated according to the second server identifier and the second account information to the DTS, and upon receiving the summary, the DTS generates a digital signature according to the summary and the time of receiving the summary, and then returns the digital signature to the second server, wherein the time information is the information of the time when the DTS receives the summary.

In an embodiment of the present disclosure, the digital signature is generated according to the time information, so that the first server determines the legality of the digital signature according to the current time and the time information, thus preventing an attacker from intercepting an operation request received by the first server and sending the operation request to the first server to spoof the first server, and thus improving the accuracy of the first account information and system security.

In another embodiment of the present disclosure, Step 302 can be substituted by the following step: the second server generates a digital signature according to the second server identifier and the second account information.

Note that the Step 302 is optional, that is, the second server may generate the digital signature by default, so that the first server determines the legality of the digital signature and performs subsequent steps upon determining that the digital signature is legal, or may not generate the digital signature, so that the first server does not need to determine the legality of the digital signature, but directly performs subsequent steps, which is not restricted by the embodiments of the present disclosure.

303: The second server sends an operation request including the second server identifier, the second account information, the time information, and the digital signature to the first server.

Optionally, the operation request can also be forwarded by the terminal, that is, in another embodiment of the present disclosure, the Step 303 can be substituted by the following step: the second server sends an operation request including the second server identifier, the second account information, the time information, and the digital signature to the terminal, and then the terminal forwards the operation request to the first server.

Here, the terminal can start the application associated with the first server upon receiving the operation request, so as to subsequently obtain the response of the first server to the operation request. If the operation request is to request the first server to display the specified information, the terminal starts the webpage associated with the first server or the local software associated with the first server and installed in the terminal, so that the terminal can display the specified information in the started webpage or software after the first server confirms the first account information and then displays the specified information.

In another embodiment of the present disclosure, if the Step 302 is not executed, the operation request includes the second server identifier and the second account information, or in the Step 302, the operation request includes the second server identifier, the second account information, and the digital signature when the second server generates a digital signature according to the second server identifier and the second account information.

304: Upon receiving the operation request, the first server determines whether the digital signature is legal according to the second server identifier, the second account information, and the time information included in the operation request, and if yes, executes the Step 305, and if no, ends the operation.

For example, the first server generates a check-purpose digital signature according to the second server identifier, the second account information, the time information, and the predetermined signature algorithm, determines whether the digital signature is legal by comparing the digital signature with the check-purpose digital signature, determines that the digital signature is legal when the digital signature is the same as the check-purpose digital signature, and determines that the digital signature is not legal when the digital signature is different from the check-purpose digital signature.

In another embodiment of the present disclosure, when the operation request includes the second server identifier, the second account information, and the digital signature, the Step 304 can be substituted by the following step: upon receiving the operation request, the first server determines whether the digital signature is legal according to the second server identifier and the second account information included in the operation request.

Note that an embodiment of the present disclosure is exemplified by that the first server does not execute any operation upon determining that the digital signature is not legal; as a matter of fact, the first server may send a signature check failure message to the second server, so that the second server regenerates a digital signature and returns the regenerated digital signature to the first server, and the first server again determines whether the digital signature is legal. The embodiments of the present disclosure do not restrict what the first server will do upon determining that the digital signature is not legal.

305: Upon determining that the digital signature is legal, the first server determines whether account information associated with the second server identifier and the second account information is available in a predetermined three-party associating relationship, wherein the predetermined three-party associating relationship is the associating relationship between the second server identifier, the account information of the second server, and the account information of the first server.

In the embodiments of the present disclosure, the first server pre-stores the predetermined three-party associating relationship of the second server identifier, the account information of the second server, and the account information of the first server. For example, the relationship can be reflected by the fact that a second server identifier and account information of a second server correspond to the account information of a first server, or a second server identifier and account information of a second server correspond to the account information of multiple first servers. Table 1 describes the predetermined three-party associating relationship:

TABLE 1

| Field | spid | sp-userid | uin | Other |
|---|---|---|---|---|
| Predetermined associating relationship 1 between three parties | A1 | a1 | b1 | Bundled card number |
| Predetermined associating relationship 2 between three parties | A1 | a2 | b2 and b3 | Description information |

Here, the second server serves as Server A and the first server serves as Server B, the fieldname "spid" indicates the sequence number of Server A, the fieldname "sp-userid" indicates the account information (the second account information) of Server A, the fieldname "uin" indicates the account information (information of the first account) of Server B, and the other field can be description information (for example, the time of saving the predetermined three-party associating relationship, and the priority of the account information of Server B); when the first server is an e-bank server, the account of Server B is the account of an e-bank and thus the other field can be the bank card number and mobile phone number bundled with the account of the e-bank.

306: When the account information associated with the second server identifier and the second account information is not available in the predetermined three-party associating relationship, the first server sends an account information request to the terminal.

In the embodiments of the present disclosure, upon determining that the account information associated with the second server identifier and the second account information is not available in the predetermined three-party associating relationship, the first server sends an account information request to the terminal, so as to obtain the information of the first account subsequently.

In another embodiment of the present disclosure, the Step 306 can be substituted by the following step: when account information associated with the second server identifier and the second account information is available in the predetermined three-party associating relationship includes, the first serve obtains the account information associated with the second server identifier and the second account information for use as the first account information, and the Step 311 is executed.

In the embodiments of the present disclosure, upon determining that there is account information associated with the second server identifier and the second account information available in the predetermined three-party associating relationship, the first server obtains the associated account information for use as the first account information. Alternatively, upon determining that there is two or more account information associated with the second server identifier and the second account information available in the predetermined three-party associating relationship, the first server randomly selects one of the account information for use as the first account information, selects the default account information for use as the first account information, or sends the two or more account information to the terminal and then the user selects one from them for use as the first account information, which is not restricted by embodiments of the present disclosure.

Based on the entries in Table 1, the account information of the first server associated with the second server identifier A1 and the account information a1 is b1, and the account information of the first server associated with the second server identifier A2 and the account information a2 is b2 and b3; upon receiving an operation request including the second server identifier A1 and the account information a1, the first server determines the account information b1 associated with A1 and a1 is available and so determines the account information b1 as the first account information. Alternatively, upon receiving an operation request including the second server identifier A2 and the account information a2, the first server determines that there is two account information b2 and b3 associated with A2 and a2, and at this time, the first server can select the default account information (for example, b2) or send an account confirmation request to the terminal, so that the terminal obtains the account information (for example, b3) selected by the user and returns an account confirmation message including the account information b3; upon receiving the account confirmation message, the first server determines the account information b3 as the first account information.

307: Upon receiving the account information request, the terminal obtains account information inputted by the user.

For example, upon receiving the account information request, the terminal displays an information input interface and obtains the account information inputted by the user in the information input interface.

In the embodiments of the present disclosure, the information input interface can further provide a registration option, so that the user can register the account information by clicking the registration option if it is not registered with the first server, so the first server obtains the first account information according to the registered account information.

308: The terminal sends the account information inputted by the user to the first server.

309: Upon receiving the account information inputted by the user, the first server determines whether the account information is the account information of the first server.

In the embodiments of the present disclosure, the account information of the first server refers to the account information registered with the first server. For example, the first server stores registered account information; upon receiving the account information, the first server determines whether the account information is stored in it; if the account information is stored in the first server, indicating that the account information has been registered, then the first server obtains the account information for use as the first account information; if the account information is not stored in the first server, indicating that the account information has not been registered, then the account information needs to be registered first so as to execute subsequent operations based on the registered account information.

310: Upon determining that the account information is the account information of the first server, the first server obtains the account information for use as the first account information.

A person skilled in the art can learn that to provide services, the first server needs to obtain the account information of a terminal, so as to provide services for the terminal based on the account information. In an embodiment of the present disclosure, the first server determines the first account information for the terminal according to the second account information used by the terminal to log into the second server, the second server identifier, and the predetermined three-party associating relationship stored in the first server, so as to provide services for the terminal subsequently according to the first account information.

In another embodiment of the present disclosure, the Step 310 can be substituted by the following step: upon determining that the account information is not the account information of the first server, the first server registers the account information and obtains the account information for use as the first account information.

In an embodiment of the present disclosure, upon determining that the account information is not stored, the first server registers the account information. The first server sends to the terminal a registration notification including the information required for registration, including a registration mailbox and a mobile phone number to be bundled. Upon receiving the registration notification, the terminal obtains the user input information, for example, the mailbox and the mobile phone number inputted by the user, and returns the information to the first server for registration. If the registration is successful, the first server obtains the registered account information for use as the first account information.

In the embodiments of the present disclosure, when a user does not register with the first server, the first server can register the account information during the process when it obtains the first account information; therefore, the embodiments of the present disclosure do not restrict whether the user has registered the first server before the terminal sends an operation instruction to the second server.

Subsequent to the Step 310, the method further includes: the first server stores the associating relationship between three parties of the second server identifier, the second account information, and the first account information.

By storing the three-party associating relationship, the first server can, upon receiving an operation request next time, determine the first account information directly according to the second server identifier and the second account information included in the operation request, and the predetermined three-party associating relationship, and does not need to obtain the account information inputted by the user via the terminal again. By storing the associating relationship between three parties including different server identifiers, the account information of the server, and the account information of the first server, the predetermined three-party associating relationship can be updated dynamically.

311: Based on the first account information, the first server responds to the operation request.

In the embodiments of the present disclosure, upon obtaining the first account information, the first server responds to the operation request based on the first account information; wherein both the operation request and the response mode of the first server vary with the operation instruction of the terminal. For example, the following mode can be adopted:

(1) When the operation instruction is to share specified information in the second server with the first server, the operation request including the specified information is to request the first server to display the specified information; then, the Step 311 includes: the first server displays the specified information based on the first account information.

When the first server provides services for the terminal based on the first account information, the terminal has logged into the first server; then, the terminal can maintain the login status with the first server based on the first account information; subsequently, when the terminal needs to perform an operation requiring the response of the first server, the terminal can directly send an operation instruction to the first server in the scenario where the first server provides services, so that the first server responds to the operation instruction based on the first account information.

(2) When the operation instruction is to make payment for an order specified by the second server, the operation request including the number of the specified order is to request the first server to make payment for the specified order; then, the Step 311 includes: the first server logs into an e-bank (or online payment services such as AliPay© or Tenpay©) based on the first account information, obtains the payment password inputted by the user, and make payment for the specified order.

Wherein, when the first server provides services for the terminal based on the first account information, the terminal has logged into the first server; for the operations requiring high security (for example, online payment), however, the terminal logs into the first server temporarily based on the first account information; after a predetermined period, the first server stops providing services for the terminal irrespective of whether the online payment operation responds successfully, that is, the first server cancels the login status of the terminal with the first server based on the first account information; alternatively, when the online payment operation is successful, the first server automatically cancels the login status of the terminal with the first server based on the first account information, so that the terminal switches to being served by the second server. Subsequently, if wanting to register the first server for online payment, the terminal needs to resend an operation instruction to the second server, so that the first server responds to the operation instruction again based on the first account information. The embodiments of the present disclosure do not restrict whether the terminal still maintains the login to the first server after the first server responds to the operation request.

Note that when the terminal switches to being served by the first server instead of the second server, the terminal can maintain login to the second server based on the second account information, or terminate login to the second server based on the second account information and then be served by the first server. The embodiments of the present disclosure do not restrict whether the terminal maintains its login to the second server based on the second account information.

For a method provided by the embodiments of the present disclosure, while the second server provides services for the terminal, the first server obtains the information of the first account according to the second server identifier, the second account information used by the terminal to log into the second server, and the predetermined three-party associating relationship, and then responds to the operation of the terminal based on the first account information, thus streamlining the operations between the terminal and the first and second servers, and reducing the time consumed by cross-service operations. In addition, the second server generates a digital signature, thus preventing an attacker from intercepting an operation request received by the first server and sending the operation request to the first server to spoof the first server, and thus improving the accuracy of the first account information and system security.

Figure 4:
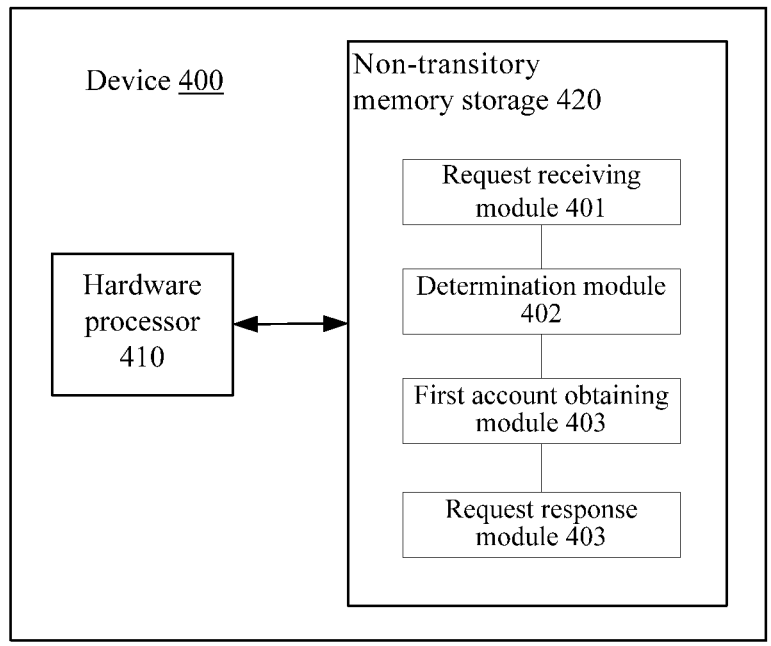
FIG. 4 shows the structure diagram of an operation processing device provided in an embodiment of the present disclosure.

FIG. 4 shows an example structure diagram of an operation processing device 400 provided by embodiments of the present disclosure. The device 400 includes a hardware processor 410 and a non-transitory storage medium accessible to the processor 410. The non-transitory storage medium is configured to store modules including: a request receiving module (401), a determination module (402), a first account acquisition module (403), and a request response module (404).

Here, the request receiving module (401) is configured to receive an operation request including the second server identifier, and the second account information used by a terminal to log into the second server; the determination module (402) connected to the request receiving module (401) is configured to determine whether account information associated with the second server identifier and the second account information is available in a predetermined three-party associating relationship, the predetermined three-party associating relationship being the associating relationship between the second server identifier, the account information of the second server, and the account information of the local side; the first account acquisition module (403) connected to the determination module (402) is configured to, if it determines that the account information associated with the second server identifier and the second account information is available in the predetermined three-party associating relationship, obtain the account information associated with the second server identifier and the second account information for use as the first account information; the request response module (404) connected to the first account acquisition module (403) is configured to respond to the operation request based on the first account information.

Optionally, the request sending module (401) includes:

A first receiving unit, configured to receive an operation request sent by the second server;

Or a second receiving unit, configured to receive an operation request forwarded by the terminal.

Optionally, the operation request further includes a digital signature generated by the second server according to the second server identifier and the second account information; and the device further includes:

A first determination module, configured to determine whether the digital signature is legal according to the second server identifier and the second account information included in the operation request;

A first execution module, configured to, upon determining that the digital signature is legal, determine whether account information associated with the second server identifier and the second account information is available in a predetermined three-party associating relationship.

Optionally, the operation request further includes time information and a digital signature generated by the second server according to the second server identifier, the second account information, and the time information; and the device further includes:

A second determination module, configured to determine whether the digital signature is legal according to the second server identifier, the second account information, and the time information included in the operation request;

A second execution module, configured to, upon determining that the digital signature is legal, determine whether account information associated with the second server identifier and the second account information is available in a predetermined three-party associating relationship.

Optionally, the time information is the information of the time when the second server generates the digital signature.

Optionally, the device further includes:

An account request sending module, configured to, upon determining that the account information associated with the second server identifier and the second account information is not available in the predetermined three-party associating relationship, send an account information request to the terminal, so that the terminal obtains account information inputted by a user and returns the account information to the local side;

An account receiving module, configured to receive the account information inputted by the user;

A second account acquisition module, configured to obtain the account information inputted by the user for use as the first account information;

A three-party saving module, configured to save the associating relationship between the three parties of the second server identifier, the second account information, and the first account information.

Optionally, the second account acquisition module includes:

An account determination unit, configured to determine whether the account information is the account information of the local side;

An account obtaining unit, configured to obtain the account information (if determined as the account information of the local side) as the first account information; or, A registration unit, configured to, if it is determined the account information is not the account information of the local side, register the account information and obtain the account information for use as the first account information.

For a device provided by the embodiments of the present disclosure, while the second server provides services for the terminal, the first server obtains the first account information according to the second server identifier, the second account information used by the terminal to log into the second server, and the predetermined three-party associating relationship, and responds to the operations of the terminal based on the first account information, thus streamlining the interactions between the terminal and the first and second servers, and reducing the time consumed by cross-service operations.

Figure 5:
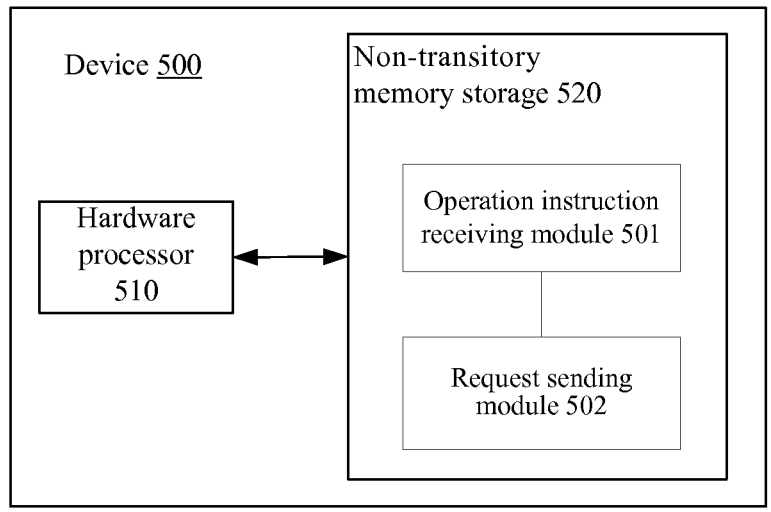
FIG. 5 shows the structure diagram of an operation processing device provided in an embodiment of the present disclosure.

FIG. 5 shows an example structure diagram of an operation processing device 500 according to embodiments of the present disclosure. The device 500 includes a hardware processor 510 and a non-transitory storage medium 520 accessible to the hardware processor 510. The non-transitory storage medium 520 is configured to store modules including an operation instruction receiving module (501) and a request sending module (502).

The operation instruction receiving module (501) is configured to receive an operation instruction sent by a terminal, wherein the operation instruction includes a first server identifier, and second account information used by the terminal to log into the local side, the request sending module (502) connected to the operation instruction receiving module (501) is configured to send to the first server an operation request including the local side identifier and the second account information according to the first server identifier, so that the first server determines whether account information associated with the local side identifier and the second account information is available in a predetermined three-party associating relationship, and, if yes, responds to the operation request according to the account information associated with the local side identifier and the second account information.

Optionally, the request sending module (502) includes:

A first sending unit, configured to send the operation request to the first server according to the first server identifier;

Or a second sending unit, configured to send the operation request to the terminal, so that the terminal forwards the operation request to the first server according to the first server identifier.

Optionally, the request sending module (502) includes:

A first signature generating unit, configured to generate a digital signature according to the local side identifier and the second account information;

A first request sending unit, configured to send the operation request including the local side identifier, the second account information, and the digital signature to the first server, so that the first server determines whether the digital signature is legal according to the local side identifier and the second account information.

Optionally, the request sending module (502) includes:

A second signature generating unit, configured to generate a digital signature according to the local side identifier, the second account information, and time information;

A second request sending unit, configured to send the operation request including the local side identifier, the second account information, the time information, and the digital signature to the first server, so that the first server determines whether the digital signature is legal according to the local side identifier, the second account information, and the time information.

Optionally, the time information is the information of the time when the local side generates the digital signature.

For a device provided by the embodiments of the present disclosure, while the second server provides services for the terminal, the first server obtains the information of the first account according to the second server identifier, the second account information used by the terminal to log into the second server, and the predetermined three-party associating relationship, and responds to the operations of the terminal based on the first account information, thus streamlining the interactions between the terminal and the first and second servers, and reducing the time consumed by cross-service operations.

Note that the operation processing of the operation processing device according to the above embodiment of the present disclosure is illustrated only by the functional modules; in practice, the above functions can be performed by different functional modules, that is, the internal structure of the first server and the second server can be divided into different functional modules, so as to perform some or all of the above functions. In addition, the operation processing device according to the above embodiment of the present disclosure complies with the same guiding principles as the embodiments of the operation processing method. For details about its implementation process, refer to the embodiments of the operation processing method.

Figure 6:
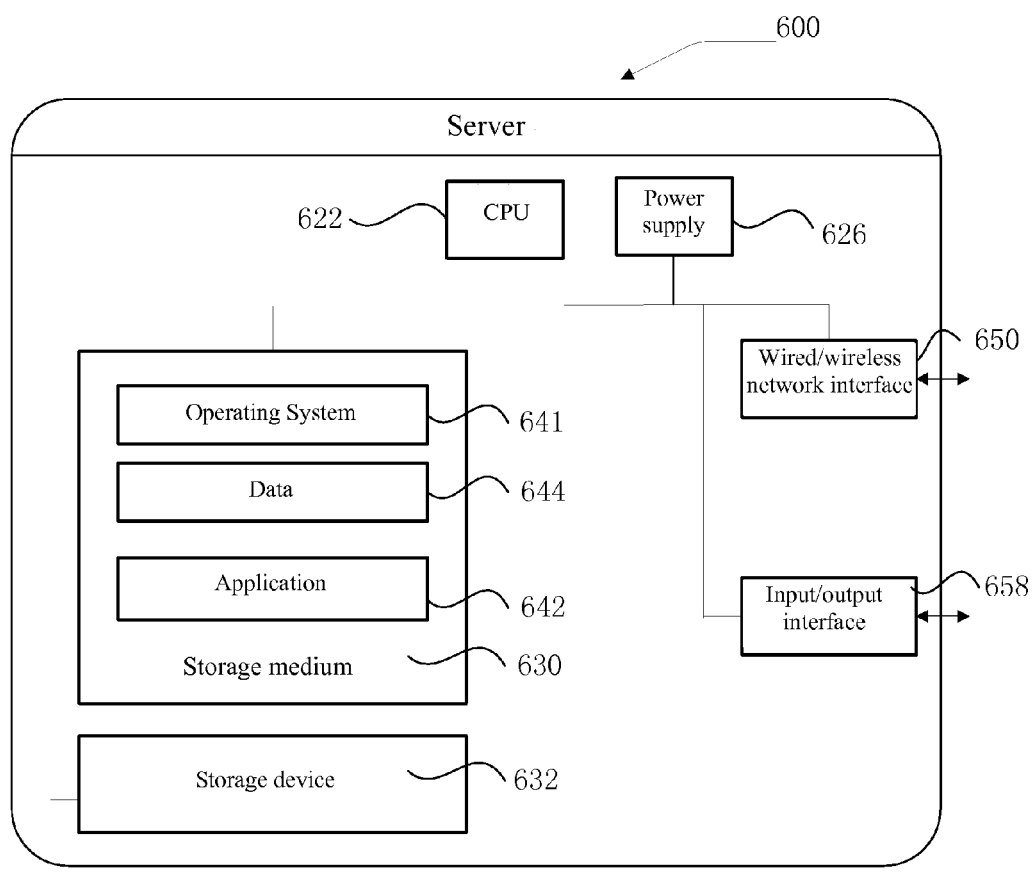
FIG. 6 shows the structure diagram of a server provided in an embodiment of the present disclosure.

FIG. 6 shows the structure diagram of a server provided in an embodiment of the present disclosure. The server (600) may vary greatly with configurations or performance, and may comprise at least one CPU (622), a memory (632), and at least one storage medium (630) for the storage application (642) or the data (644), where the memory (632) and the storage medium (630) can store data transiently or persistently, the programs stored in the storage medium (630) can include at least one module (not illustrated), each of which can include a series of operation instructions to the server. Further, the CPU (622) can be configured to communicate with the storage medium (630), and the server (600) executes a series of operation instructions stored in the storage medium (630).

The server (600) can comprise at least one power supply (626), at least one wired/wireless network interface (650), at least one input/output interface (658), and/or at least one operating system (641) including Windows, Server™, Mac OS X™, Unix™, Linux™, and FreeBSD™.

In the above embodiment, the steps executed by the first server and the second server can be based on the server structure shown in FIG. 6.

A person skilled in the art can understand that all or some of the steps in implementing the above embodiments can be implemented by hardware or by instructing the related hardware with a computer program, and the computer program can be stored in a computer readable storage medium, wherein the storage medium can be a ROM, disk, or CD.

The above only discloses example embodiments of the present disclosure, which do not restrict the present invention. Any changes, equivalent substitutions, and improvements made within the scope of spirits and principles of the present disclosure nevertheless fall within the scope of claims of the present disclosure.

What is claimed is:

1. An operation processing method, comprising:
  receiving, by a first server comprising a processor, an operation request comprising a second server identifier and second account information for logging into the second server, wherein the operation request further comprises a digital signature and time information, the digital signature being generated by the second server according to the second server identifier, the second account information and the time information, the method further comprising:
    determining, by the first server, whether the digital signature is legal according to the second server identifier, the second account information, and the time information comprised in the operation request; and
    upon determining that the digital signature is legal, determining, by the first server, whether the account information associated with the second server identifier and the second account information is available in the predetermined three-party associating relationship;
  according to the second server identifier and the second account information, determining, by the first server, whether account information associated with the second server identifier and the second account information is available in a predetermined three-party associating relationship, wherein the predetermined three-party associating relationship comprises an associating relationship between the second server identifier, the account information of the second server, and the account information of the first server;
  upon determining that the account information associated with the second server identifier and the second account information is available in the predetermined three-party associating relationship, the first server obtains the associated account information for use as first account information; and
  responding, by the first server, to the operation request based on the first account information.

2. The method according to claim 1, wherein receiving the operation request by the first server comprises at least one of the following:
  receiving, by the first server, the operation request sent by the second server; and
  receiving, by the first server, the operation request forwarded by a terminal.

3. The method according to claim 1, wherein the operation request further comprises a digital signature generated by the second server according to the second server identifier and the second account information, the method further comprising:
  determining, by the first server, whether the digital signature is legal according to the second server identifier and the second account information comprised in the operation request; and
  upon determining that the digital signature is legal, determining, by the first server, whether the account information associated with the second server identifier and the second account information is available in the predetermined three-party associating relationship.

4. The method according to claim 1, wherein the time information comprises the information of the time when the second server generates the digital signature.

5. The method according to claim 1, wherein, after the first server determines whether the account information associated with the second server identifier and the second account information is available in the predetermined three-party associating relationship, the method further comprises:
  upon determining that the account information associated with the second server identifier and the second account information is available in the predetermined three-party associating relationship, sending, by the first server, an account information request to a terminal, so that the terminal obtains account information inputted by a user and returns the account information to the first server;
  receiving, by the first server the account information inputted by the user;
  obtaining, by the first server, the account information inputted by the user as the first account information; and
  saving, by the first server, the associating relationship between the three parties of the second server identifier, the second account information, and the first account information.

6. The method according to claim 5, wherein obtaining the account information inputted by the user comprises:
  determining, by the first server whether the account information is the account information of the first server;
  upon determining that the account information is the account information of the first server, obtaining the account information as the first account information; and
  upon determining that the account information is not the account information of the first server, registering the account information and obtaining the account information as the first account information.

7. An operation processing method, comprising:
  receiving, by a second server comprising a processor, an operation instruction sent by a terminal, wherein the operation instruction comprises a first server identifier and second account information for logging into the second server; and
  according to the first server identifier, sending, by the second server, an operation request comprising the second server identifier and the second account information to the first server, so that the first server determines whether account information associated with the second server identifier and the second account information is available in a predetermined three-party associating relationship, and, if yes, responds to the operation request based on the second account information and the account information associated with the second server identifier, wherein the sending of the operation request by the second server to the first server according to the first server identifier comprises:
  generating, by the second server, a digital signature according to the second server identifier, the second account information and time information; and
  sending, by the second server, the operation request comprising the second server identifier, the second account information, the time information, and the digital signature to the first server, so that the first server determines whether the digital signature is legal according to the second server identifier, the second account information, and the time information.

8. The method according to claim 7, wherein sending the operation request by the second server to the first server according to the first server identifier comprises at least one of the following:
  sending, by the second server, the operation request to the first server according to the first server identifier; and
  sending, by the second server, the operation request to the terminal, so that the terminal forwards the operation request to the first server according to the first server identifier.

9. The method according to claim 7, wherein sending the operation request by the second server to the first server according to the first server identifier comprises:
  generating, by the second server, a digital signature according to the second server identifier and the second account information; and
  sending, by the second server, the operation request comprising the second server identifier, the second account information, and the digital signature to the first server, so that the first server determines whether the digital signature is legal according to the second server identifier and the second account information.

10. The method according to claim 7, wherein the time information comprises the information of the time when the second server generates the digital signature.

11. An operation processing device, comprising a processor and a non-transitory storage medium accessible to the processor, the non-transitory storage medium configured to store modules comprising:
  a request receiving module, configured to receive an operation request comprising a second server identifier, and second account information used by a terminal to log into the second server, wherein the operation request further comprises a digital signature and time information generated by the second server according to the second server identifier, the second account information, and the time information, the non-transitory storage medium configured to store modules further comprising:
  a second determination module, configured to determine whether the digital signature is legal according to the second server identifier, the second account information, and the time information comprised in the operation request; and
  a second execution module, configured to, upon determining that the digital signature is legal, determine whether account information associated with the second server identifier and the second account information is available in the predetermined three-party associating relationship;
  a determination module, configured to determine, according to the second server identifier and the second account information, whether account information associated with the second server identifier and the second account information is available in a predetermined three-party associating relationship, wherein the predetermined three-party associating relationship is the associating relationship between the second server identifier, the account information of the second server, and the account information of the local side;
  a first account acquisition module, configured to obtain the account information associated with the second server identifier and the second account information for use as first account information, when it is determined that the account information associated with the second server identifier and the second account information is available in the predetermined three-party association relationship; and
  a request response module, configured to respond to the operation request based on the first account information.

12. The device according to claim 11, wherein the request receiving module comprises at least one of the following:
  a first receiving unit, configured to receive an operation request sent by the second server; and
  a second receiving unit, configured to receive an operation request forwarded by the terminal.

13. The device according to claim 11, wherein the operation request further comprises a digital signature generated by the second server according to the second server identifier and the second account information, the non-transitory storage medium configured to store modules further comprising:
  a first determination module, configured to determine whether the digital signature is legal according to the second server identifier and the second account information comprised in the operation request; and
  a first execution module, configured to, upon determining that the digital signature is legal, determine whether account information associated with the second server identifier and the second account information is available in the predetermined three-party associating relationship.

14. The device according to claim 11, wherein the time information comprises the information of the time when the second server generates the digital signature.

15. The device according to claim 11, further comprising:
  an account request sending module, configured to, upon determining that the account information associated with the second server identifier and the second account information is not available in the predetermined three-party associating relationship, send an account information request to the terminal, so that the terminal obtains account information inputted by a user and returns the account information to the local side;
  an account receiving module, configured to receive the account information inputted by the user;
  a second account acquisition module, configured to obtain the account information inputted by the user for use as the first account information; and a three-party saving module, configured to save the associating relationship between the three parties of the second server identifier, the second account information, and the first account information.

16. The device according to claim 15, wherein the second account acquisition module comprises:
an account determination unit, configured to determine whether the account information is the account information of the local side;
an account obtaining unit, configured to obtain, when it is determined that the account information is the account information of the local side, the account information for use as the first account information; and
a registration unit, configured to register and obtain, when it is determined the account information not the account information of the local side, the account information for use as the first account information.

* * * * *